United States Patent
Smith

(10) Patent No.: US 9,788,348 B2
(45) Date of Patent: Oct. 10, 2017

(54) METHOD AND APPARATUS FOR PROVIDING WIRELESS SERVICE TO A COLLECTIVE OF REMOTE UNITS BY A WIRELESS LOCAL AREA NETWORK

(75) Inventor: Dwight R. Smith, Grapevine, TX (US)

(73) Assignee: Google Technology Holdings LLC, Mountain View, CA (US)

(*) Notice: Subject to any disclaimer, the term of this patent is extended or adjusted under 35 U.S.C. 154(b) by 999 days.

(21) Appl. No.: 13/443,952

(22) Filed: Apr. 11, 2012

(65) Prior Publication Data

US 2012/0287914 A1 Nov. 15, 2012

Related U.S. Application Data

(60) Provisional application No. 61/484,525, filed on May 10, 2011.

(51) Int. Cl.
*H04W 4/00* (2009.01)
*H04W 76/00* (2009.01)
(Continued)

(52) U.S. Cl.
CPC .......... *H04W 76/002* (2013.01); *H04W 4/06* (2013.01); *H04W 76/021* (2013.01); *H04W 84/12* (2013.01); *H04W 84/18* (2013.01)

(58) Field of Classification Search
CPC .... H04W 76/002; H04W 76/021; H04W 4/06
(Continued)

(56) References Cited

U.S. PATENT DOCUMENTS 7,978,667 B2 7/2011 Kalhan et al.
2005/0276237 A1 12/2005 Segal et al.
(Continued)

FOREIGN PATENT DOCUMENTS

CN 1802839 A 7/2006
EP 2048823 A1 4/2009
(Continued)

OTHER PUBLICATIONS

Park, Minyoung et al.: "Low Power Capability Support for 802. 11ah", IEEE 802.11-11/0060r1, Jan. 17, 2011, Intel Corp., all pages.
(Continued)

*Primary Examiner* — Derrick Ferris
*Assistant Examiner* — Farhad Ali
(74) *Attorney, Agent, or Firm* — Lerner, David, Littenberg, Krumholz & Mentlik, LLP

(57) ABSTRACT

A wireless local area network (WLAN) provides wireless service to a collective comprising multiple remote units (RUs) by use of a collective association identifier (AID) assigned to, and shared by, the multiple RUs. The WLAN then uses the collective association identifier AID to identify transmissions of common data to the multiple remote units. Furthermore, the WLAN provides for a serving AP to store, for the collective as a whole, shared data rather than individually storing such data in association with each remote unit (RU) in the collective. The WLAN further provides for RUs to establish a link with their serving AP in order to exchange data sourced by, or intended for, their associated non-RF service provider, and for the AP then to establish a separate AP-to-service provider link to exchange the data, rather than the RU being required to establish an end-to-end link with the service provider.

22 Claims, 6 Drawing Sheets

(51) Int. Cl.
*H04W 4/06* (2009.01)
*H04W 76/02* (2009.01)
*H04W 84/12* (2009.01)
*H04W 84/18* (2009.01)

(58) Field of Classification Search
USPC .......................................... 370/389; 389/338
See application file for complete search history.

(56) References Cited

U.S. PATENT DOCUMENTS

| | | | |
|---|---|---|---|
| 2007/0258540 A1* | 11/2007 | Ratasuk et al. | 375/267 |
| 2007/0263563 A1 | 11/2007 | Biagioni et al. | |
| 2007/0274525 A1* | 11/2007 | Takata et al. | 380/270 |
| 2008/0144591 A1* | 6/2008 | Jokela | H04W 48/12 370/338 |
| 2009/0129338 A1* | 5/2009 | Horn | H04W 48/10 370/331 |
| 2009/0147718 A1 | 6/2009 | Liu et al. | |
| 2010/0014652 A1* | 1/2010 | Yasuda | H04M 3/36 379/196 |
| 2010/0056175 A1* | 3/2010 | Bachmann et al. | 455/456.1 |
| 2012/0063335 A1* | 3/2012 | Cho | H04W 8/186 370/252 |

FOREIGN PATENT DOCUMENTS

| | | |
|---|---|---|
| WO | 2004064306 A2 | 7/2004 |
| WO | 2005114882 A2 | 12/2005 |
| WO | 2006001959 A2 | 1/2006 |
| WO | 2011025876 A1 | 3/2011 |
| WO | 2011140056 A2 | 11/2011 |

OTHER PUBLICATIONS

Kim, Suhwook et al.: "Association ID management for TGah", IEEE 802.11-11/0088r1, Jan. 16, 2011, LG, Electronics, all pages.
Notice of Preliminary Rejection for Korean Application No. 10-2013-7029445 dated Oct. 13, 2014.
Patent Cooperation Treaty, International Search Report and Written Opinion of the International Searching Authority for International Application No. PCT/US2012/035344, Aug. 3, 2012, 11 pages.
Notification of First Office Action dated Jul. 28, 2016, for Chinese Patent Application No. 201280022494.2.
Notification of the Second Office Action for Chinese Patent Application No. 201280022494.2, dated Feb. 4, 2017.

* cited by examiner

METHOD AND APPARATUS FOR PROVIDING WIRELESS SERVICE TO A COLLECTIVE OF REMOTE UNITS BY A WIRELESS LOCAL AREA NETWORK

FIELD OF THE INVENTION

The present invention relates generally to wireless local area networks and, in particular, to a provision of wireless service to multiple remote units by a wireless local area network.

BACKGROUND OF THE INVENTION

Local area networks (LANs) allow organizations to share information over a high speed network that may be assembled with relatively inexpensive hardware components. LANs also provide for relatively inexpensive hardware connections to networks beyond the LAN by allowing multiple users within the LAN to connect to each of multiple networks outside of the LAN through an interface common to all users. Initially, LANs were limited to hardwired infrastructure, requiring the user to physically connect to the LAN via a wired connection. However, with the recent growth of wireless telephony and wireless messaging, wireless communications have also been applied to the realm of LANs, resulting in the development of wireless local area networks (WLANs).

In order for multiple remote units (RUs) to exchange data with a WLAN, each such RU must first associate with a WLAN access point (AP). Typically, this is performed by an active or passive scan of the WLAN. In an active scan, the RU initiates the establishment and configuration of a link by broadcasting a Probe Request. The Probe Request includes a Service Set Identifier (SSID) and capabilities and data rates supported by the RU. Upon receiving the Probe Request, the AP determines whether the SSID included in the Probe Request is the same as the SSID associated with the AP. When the SSIDs are the same, the AP responds to the Probe Request by transmitting a Probe Response back to the MS that includes the SSID associated with the AP. In response to receiving a Probe Response, the RU transmits an Association Request to the AP that includes the SSID and that further may include an indication of the time interval between each time the RU wakes up to listen for the AP (a 'listener interval'). Upon receiving the Association Request, the AP transmits an Association Response to the RU that includes a status code (indicating that the association has been successful) and, in low power situations, an Association Identifier (AID) that is used to individually identify the RU for data delivery by the AP.

In a passive scan, instead of utilizing a Probe Request and a Probe Response, the RU listens for a Beacon that is intermittently transmitted the AP. Similar to the Probe Response, each Beacon includes the SSID associated with the AP and capabilities and data rates supported by the AP. If the RU likes what it sees in the Beacon, it may transmit an Association Request to that AP.

The presence of a large number of RUs in an AP's coverage area can lead to several problems. For example, the addressing range for AIDs is limited for each AP, which constrains the number of RUs that can be served. By way of another example, if a need arises to concurrently contact a large number of RUs, a very large Beacon may be needed to identify all of the RUs, that is, to identify the AIDs associated with all such RUs. Still another example is that if, in order to conserve power, each RU of the multiple RUs requests a large listen interval, the AP may require a very large buffer to individually hold data that may be intended for each of the multiple RUs. The AP may not accept a large listen interval and deny the association request. This would either require the RU to try a smaller listen interval value which would require a more active engagement or to be unable to connect to its control system.

Therefore a need exists for a method and apparatus that optimizes AID assignment by an AP, conserves RU power, and minimizes a required size of data storage buffers at AP.

Figure 1:
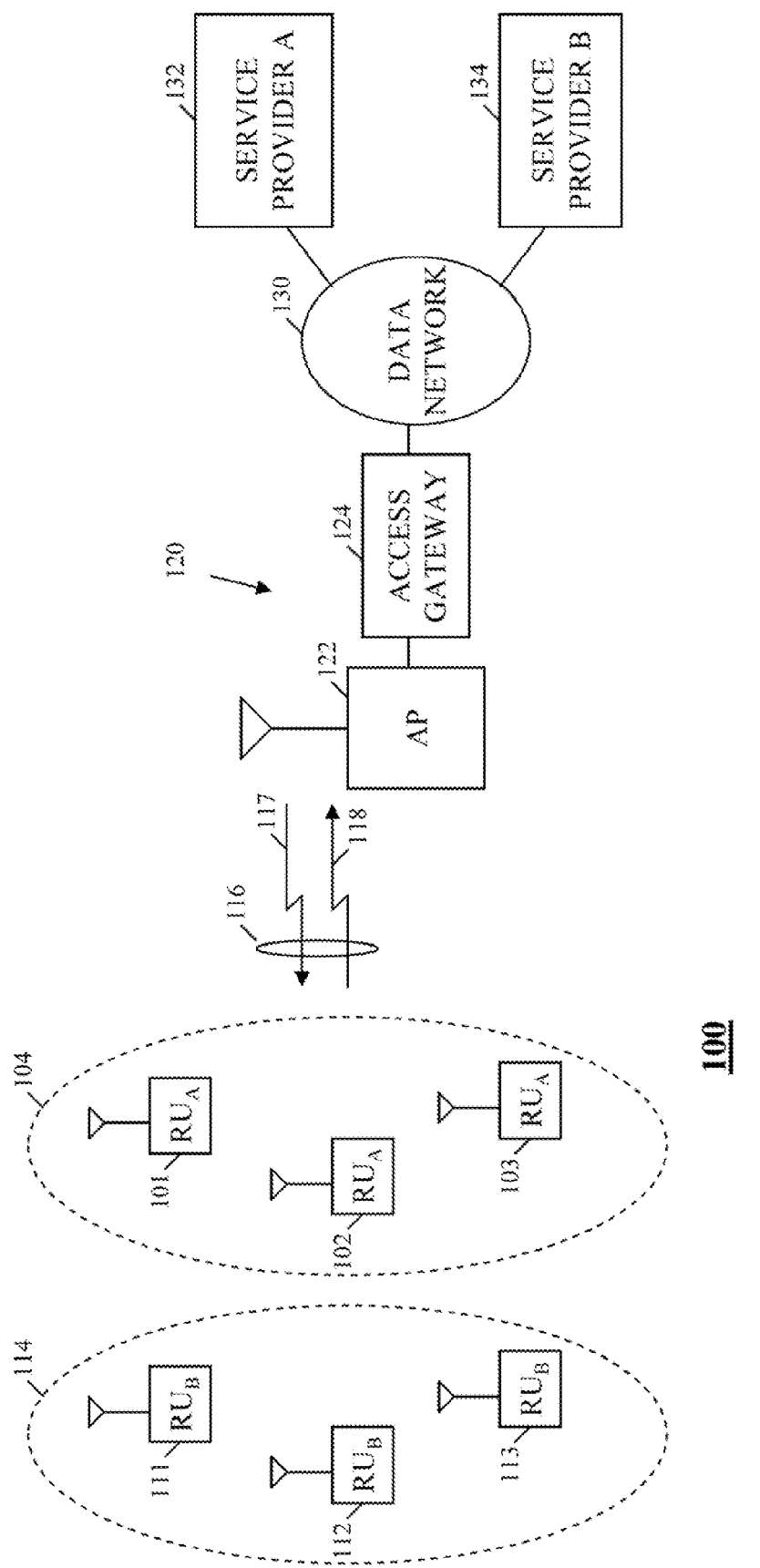
FIG. 1 is a block diagram of a wireless communication system in accordance with an embodiment of the present invention.

One of ordinary skill in the art will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention.

DETAILED DESCRIPTION OF THE INVENTION

To address the need for a method and an apparatus that optimizes association identifier (AID) assignment by an AP, conserves RU power, and minimizes a required size of data storage buffers at AP, a wireless local area network (WLAN) is provided that provides wireless service to a collective of remote units (RUs) comprising multiple RUs by use of a collective AID assigned to, and shared by, the multiple RUs. The WLAN then uses the collective AID to identify transmissions of common data to the multiple remote units. Furthermore, the WLAN provides for a serving AP to store, for the collective as a whole, shared data rather than individually storing such data in association with each remote unit (RU) in the collective. The WLAN further provides for RUs to establish a link with their serving AP in order to exchange data sourced by, or intended for, their associated non-RF service provider, and for the AP then to establish a separate AP-to-service provider link to exchange the data, rather than the RU being required to establish an end-to-end link with the service provider.

Generally, an embodiment of the present invention encompasses a method for providing wireless service by a wireless local area network (WLAN) to a plurality of RUs. The method includes assigning a collective association identifier (AID) to the plurality of RUs, conveying a signal to each RU of the plurality of RUs comprising the collective AID, and storing the collective AID in association with an identifier of each RU of the plurality of RUs.

Another embodiment of the present invention encompasses a method for interfacing with a WLAN. The method includes associating, by an RU, with an access point (AP) associated with the WLAN, receiving, by the RU from the AP, a collective AID that is associated with a plurality of RUs, and storing, by the RU, the collective AID.

Yet another embodiment of the present invention encompasses an Access Point capable of operating in a WLAN. The AP includes an at least one memory device that maintains a plurality of association identifiers (AIDs). The AP further includes a processor coupled to at least one memory device and that is configured to that assign an AID of the plurality of AIDs to a plurality of RUs to produce a collective AID, convey a signal to each RU of the plurality of RUs comprising the collective AID, and store, in the at least one memory device, an association between the collective AID and an identifier of each RU of the plurality of RUs.

Still another embodiment of the present invention encompasses an RU capable of interfacing with a WLAN. The RU includes an at least one memory device that maintains a remote unit-specific identifier associated with the RU. The RU further includes a processor that is configured to associate with an AP associated with the WLAN, receive a collective AID that is associated with a plurality of RUs, and store the collective AID in the at least one memory device.

The present invention may be more fully described with reference to FIGS. 1-7. FIG. 1 is a block diagram of a wireless communication system 100 in accordance with an embodiment of the present invention. Communication system 100 comprises a wireless local area network (WLAN) 120 that includes one or more Access Points 122 (one shown) coupled to an access gateway 124. Access Point (AP) 122 provides wireless communication services to wireless remote units (RUs), such as RUs 101-103 and 111-113, located in a coverage area serviced by the AP via an air interface 116 comprising a downlink 117 and an uplink 118. AP 122 and access gateway 124 are each elements of WLAN 120 and each also may be referred to herein as a "network element."

Preferably, each RU 101-103 and 111-113 is a low power wireless communication device that is capable of wirelessly interfacing with a WLAN and that is fixed in its position, such as a wireless communication-enabled gas meter or a wireless communication-enabled water meter affixed to a consumer's home or place of business; however, in other embodiments of the present invention one or more of RUs 101-103 and 111-113 may be a portable, mobile, or cellular communication device, such as but not limited to a cellular telephone, a radiotelephone, a smartphone, or a wireless communication-enabled data terminal equipment, such as a personal computer, a laptop computer, or a workstation that is capable of operating in a WLAN communication system.

AP 122 is utilized by, that is, provides wireless radio frequency (RF) communication services on behalf of, multiple public and/or private service providers 132, 134 (two shown) that communicate with WLAN 120, and in particular with AP 122 (via access gateway 124), via a public or private data network 130, such as the Internet. Service providers 132, 134 are non-RF service providers, for example but not limited to, utility companies such as a natural gas utility company, an electric utility company, or a water utility company, that utilize an RF service provider network, that is, WLAN 120, to communicate with RUs associated with the service provider. As depicted in FIG. 1, a first set of RUs of the multiple RUs 101-103 and 111-113, that is, RUs 101-103, are dedicated to providing service in association with a first service provider of the multiple service providers 132, 134, that is, service provider 'A' 132 (and which remote units correspondingly are denoted '$RU_A$' in FIG. 1). The RUs associated with a particular service provider and serviced by a given AP, such as RUs 101-103 and service provider 132, are referred to herein as an RU "collective," and thus RUs 101-103 together are referred to herein as a first collective 104. A second set of RUs of the multiple RUs 101-103 and 111-113, that is RUs 111-113, are dedicated to providing service in association with a second service provider of the multiple service providers 132, 134, that is, service provider 'B' 134 (and which remote units correspondingly are denoted '$RU_B$' in FIG. 1) and are referred to herein as a second collective 114.

Figure 2:
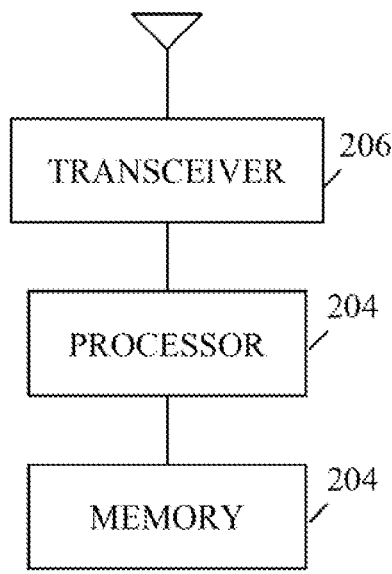
FIG. 2 is a block diagram of wireless remote unit of the communication system of FIG. 1 in accordance with an embodiment of the present invention.
Figure 3:
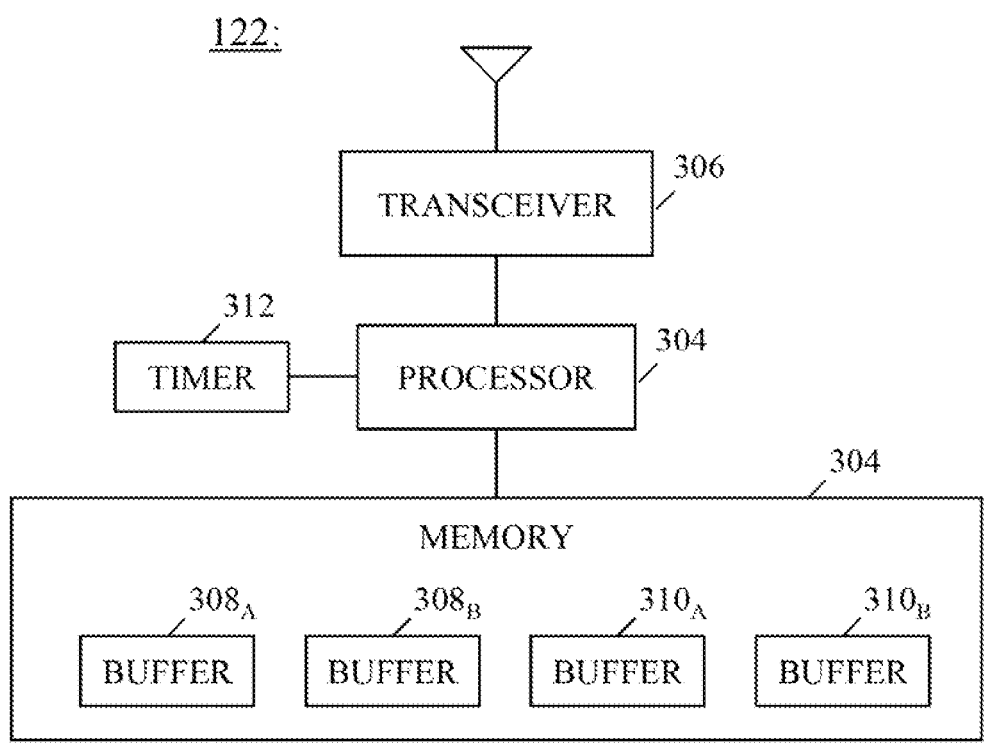
FIG. 3 is a block diagram of an access point of the communication system of FIG. 1 in accordance with an embodiment of the present invention.

Referring now to FIGS. 2 and 3, block diagrams are provided of a remote unit (RU) 200, such as RUs 101-103 and 111-113, and AP 122 in accordance with an embodiment of the present invention. Each of RU 200 and AP 122 includes a respective processor 202, 302 such as one or more microprocessors, microcontrollers, digital signal processors (DSPs), combinations thereof or such other devices known to those having ordinary skill in the art. The particular operations/functions of processors 202 and 302, and correspondingly of RU 200 and AP 122, is determined by an execution of software instructions and routines that are maintained in a respective at least one memory device 204, 304 associated with the processor, such as random access memory (RAM), dynamic random access memory (DRAM), and/or read only memory (ROM) or equivalents thereof, that store data and programs that may be executed by the corresponding processor. Furthermore, one or more functions described herein as being performed by AP 122 may, alternatively, be performed by access gateway 124 or may be distributed between the AP and the access gateway.

Each of RU 200 and AP 122 further includes a respective radio frequency (RF) transceiver 206, 306 coupled to the corresponding processor 202, 302, which RF transceivers each includes an RF transmitter (not shown) and an RF receiver (not shown) for transmitting and receiving signals over air interface 118. Further, AP 122 may include a timer 312 that is coupled to processor 302 and that counts down time periods stored in at least one memory device 304.

At least one memory device 204 of RU 200 further maintains an RU-specific identifier, that is, an RU identifier that is uniquely associated, and that uniquely identifies, with the RU in communication system 100, a Service Set Identifier (SSID) associated with WLAN 120, and a service provider identifier associated with a service provider 132, 134 that is associated with the RU. At least one memory device 304 of AP 122 also maintains the WLAN identifier, that is, the SSID, and assignment status of Association Identifiers (AIDs) available to the AP, and further includes one or more downlink data buffers $308_A$, $308_B$, (two shown)

that stores data received from service providers 132, 134, respectively, and respectively intended for associated RUs 101-103 and 111-113, and one or more uplink data buffers $310_A$, $310_B$, (two shown) that stores data received from RUs 101-103 and 111-113, respectively, and respectively intended for associated service providers 132 and 134. In various other embodiments of the present invention, instead of a separate set of buffers associated with each service provider, that is, buffers $308_A$ and $310_A$ with respect to service provider 132 and buffers $308_B$ and $310_B$ with respect to service provider 134, AP 122 may include only a single data buffer for each service provider that stores data for both uplink and downlink transmissions in association with the service provider, only a single downlink buffer and a single uplink buffer that respectively store data for uplink transmissions and downlink transmissions for all service providers, or only a single buffer that stores data for all uplink and downlink transmissions.

Preferably, communication system 100 operates in accordance with the Institute for Electrical and Electronic Engineers (IEEE) 802.11 standards for WLAN communication systems, which standards are hereby incorporated herein in their entirety and are available from the IEEE administrative offices in Piscataway, N.J., or on-line at standards.ieee.org. However, one of ordinary skill in the art realizes that the principles described herein may apply to any 802.xx communication system, for example, a communication system operating under any of the 802.11 standards or under the 802.16 or 802.21 standards.

In order to optimize AID assignment by AP 122, conserve RU power, and minimize a required size of buffer 308 at AP 122, communication system 100 employs a collective AID that is used to collectively identify all RUs associated with a same service provider. By utilizing a collective association identifier (AID) that assigned to, and shared by, the multiple RUs belonging to a collective of RUs, and which collective of RUs are associated with a same non-RF service provider, communication system 100 optimizes AID usage by a serving AP. Use of the collective association AID allows the serving AP to singly store common data intended for all RUs in the collective and to broadcast such data to the collective of RUs without the need to individually identify each such RU in the broadcast. Thus RU power is conserved by allowing the RU to merely wake up and receive a broadcast of the data by the AP, as opposed to having to associate with the AP each time the RU wishes to receive data from the AP, and a required size of a buffer at the serving AP, that stores data intended for the collective of RUs, is minimized.

Communication system 100 further provides for RUs to establish a link with their serving AP in order to exchange data sourced by, or intended for, their associated non-RF service provider, and for the AP then to establish a separate AP-to-service provider link to exchange the data, rather than the RU being required to establish an end-to-end link with the service provider, further conserving RU power and reducing a communication session set up time for the RU, as the RU only sets up a communication session with the AP and not an end-to end session with the service provider. With the RU submitting its data to the AP and getting a data received acknowledgement directly, it is able to quickly return to a sleep mode and avoid the time needed to convey the data using a full transmission protocol such as TCP or HTTP. These types of communications require session setup, delivery and session teardown which, if performed by the RU, require it to stay awake for an indeterminate amount of time and be involved in several data transmissions. It would also require the RU to have an IP address (whose acquisition would either be done at the time of association or for each data upload). By adopting the send-and-forget approach, the RUs do not need to acquire an IP address which further conserves time (DHCP acquisition) and network resources (allocated IP addresses). Further, by not requiring an RU to acquire its own IP address (the AP could share an address or use its own network resources) the time to acquire an IP address is conserved. The means by which the AP/distribution reaches the service center could also evolve independent of the RU capability.

Figure 4:
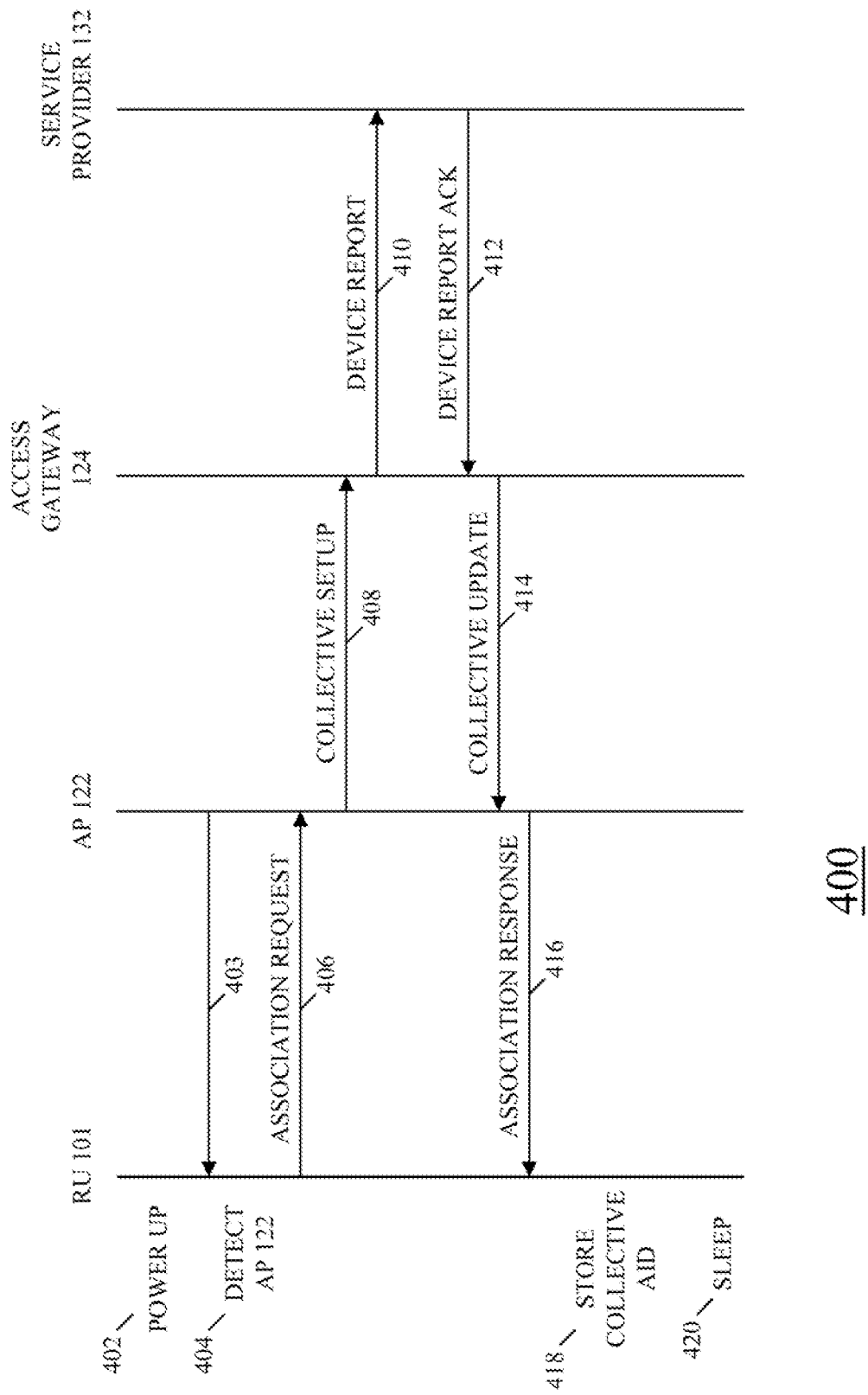
FIG. 4 is a signal flow diagram illustrating an association procedure performed by the communication system of FIG. 1 in accordance with various embodiments of the present invention.

Referring now to FIG. 4, a signal flow diagram 400 is provided that illustrates an association procedure performed by communication system 100 in accordance with various embodiments of the present invention. Signal flow diagram 400 begins when an RU 101-103, 111-113, for example, RU 101, powers up 402 in a coverage area of AP 122. In response to powering up, RU 101 detects 404 AP 122 by detecting a signal transmitted 403 by, and identifying, the AP. For example, in an active scan, RU 101 may broadcast a Probe Request that includes an SSID and capabilities and data rates supported by the RU. Upon receiving the Probe Request, AP 122 determines whether the SSID included in the Probe Request is the same as the SSID associated with the AP. When the SSIDs are the same, the AP responds to the Probe Request by transmitting a Probe Response back to the MS that includes the SSID associated with the AP. By way of another example, in a passive scan, RU 101 may detect a Beacon that is intermittently transmitted the AP. Similar to the Probe Response, each Beacon includes the SSID associated with the AP and capabilities and data rates supported by the AP.

The Probe Response/Beacon conveyed by the AP to the RU further may include an indication of whether the AP supports collectives, that is, a collection of multiple RUs (for example, RUs 101-103 or RUs 111-113) associated with a service provider, and if so, further may identify the types of support provided and collectives supported by the AP, for example, collectives associated with service providers 132 and 134, that is, collectives 104 and 114, respectively. For example, the indication of support may be a flag in the Probe Response/Beacon, and the types of support provided may include shared Internet Protocol (IP) addresses and delayed acknowledgements (as opposed to immediately acknowledging messages upon their receipt).

In response to detecting AP 122, RU 101 associates with the AP. More particularly, RU 101 transmits 406 an Association Request to the AP. The Association Request includes the SSID associated with AP 122, an identifier of RU 101, that is, RU 101's RU identifier, and 'collective' information, that is, information that indicates that RU 101 is part of collective 104 comprising multiple RUs, that is, RUs 101-103, associated with a particular service provider, that is, service provider 132. For example, the collective information may include an identifier of service provider 132, such as a domain name associated with the service provider, a Uniform Resource Identifier (URI) or Uniform Resource Locator (URL) associated with the service provider, a contract number associated with a service agreement between the RU and the service provider, or any other identifier of a service provider that may occur to one of ordinary skill in the art. The Association Request further may include an indication of the time interval expiring between each time the RU wakes up to listen for the AP (a 'listen interval').

In response to receiving the Association Request, and based on the collective information included in the Association Request, AP 122 assigns an AID to collective 104 (referred to herein as a "collective AID") if one has not yet been assigned. As used herein, a "collective AID" refers to an AID that will be shared among all RUs in a collective associated with a service provider, for example, collective 104 associated with service provider 132. AP 122 then adds RU 101 to collective 104, that is, stores RU 101's RU identifier in the at least one memory device 304 of the AP in association with the identifier of service provider 132 and further in association with the collective AID assigned to collective 104.

AP 122 need not assign an IP address to RU 101, as dedicated links of communication between the RU's associated service provider 132 need not be set up; rather, if an IP address is needed, an IP address may be assigned to the collective as a whole, that is, a same IP address may be shared among all RUs in the collective. Thus, a "collective IP address" may be employed by communication system 100, by which collective IP address the service provider, such as service provider 132, may communicate with its collective of RUs, that is, collective 104. Alternatively, the AP may use a common IP address for all collectives at the AP, for example, collectives 104 and 114, and when the AP receives messages for a particular collective, the AP may identify the intended RUs by use of the associated collective AID.

Referring again to signal flow diagram 400, AP 122 further informs 408 access gateway 124 of the inclusion of RU 101 in collective 104 associated with service identifier 132 by conveying, to the access gateway, a message that includes the identifier of service provider 132, the identifier of RU 101, and the AID associated with the collective associated with service provider 132. In response, access gateway 124 conveys 410 a device report to service provider 132 identifying RU 101, and the service provider acknowledges 412, to the access gateway, receipt of the device report.

In response to receiving an acknowledgment of the device report, access gateway 124 conveys 414 a collective update to AP 122 that informs the AP 122 that RU 101 has been reported to service provider 132. In response to receiving the collective update, AP 122 transmits 416 an Association Response to RU 101 indicating that the association has been successful, for example, by conveying a particular status code to the RU or by conveying a collective acknowledgment. The Association Response further includes the collective AID that will be used to identify transmissions of data by AP 122 to collective 104, that is, to RUs 101-103 associated with service provider 132. In response to receiving the Association Response, RU 101 stores 418 the collective AID in at least one memory device 204 of the RU and then may return to sleep 420.

Steps 402-420 may be repeated with respect to each remote unit of the multiple remote units 101-103 in collective 104, for example, a second remote unit 102, a third remote unit 103, and so on, until each remote unit of the multiple remote units has been assigned and conveyed, and stores at the remote unit, the collective AID associated with collective 104, and further is reported to associated service provider 132, and signal flow diagram 400 then ends.

Figure 5:
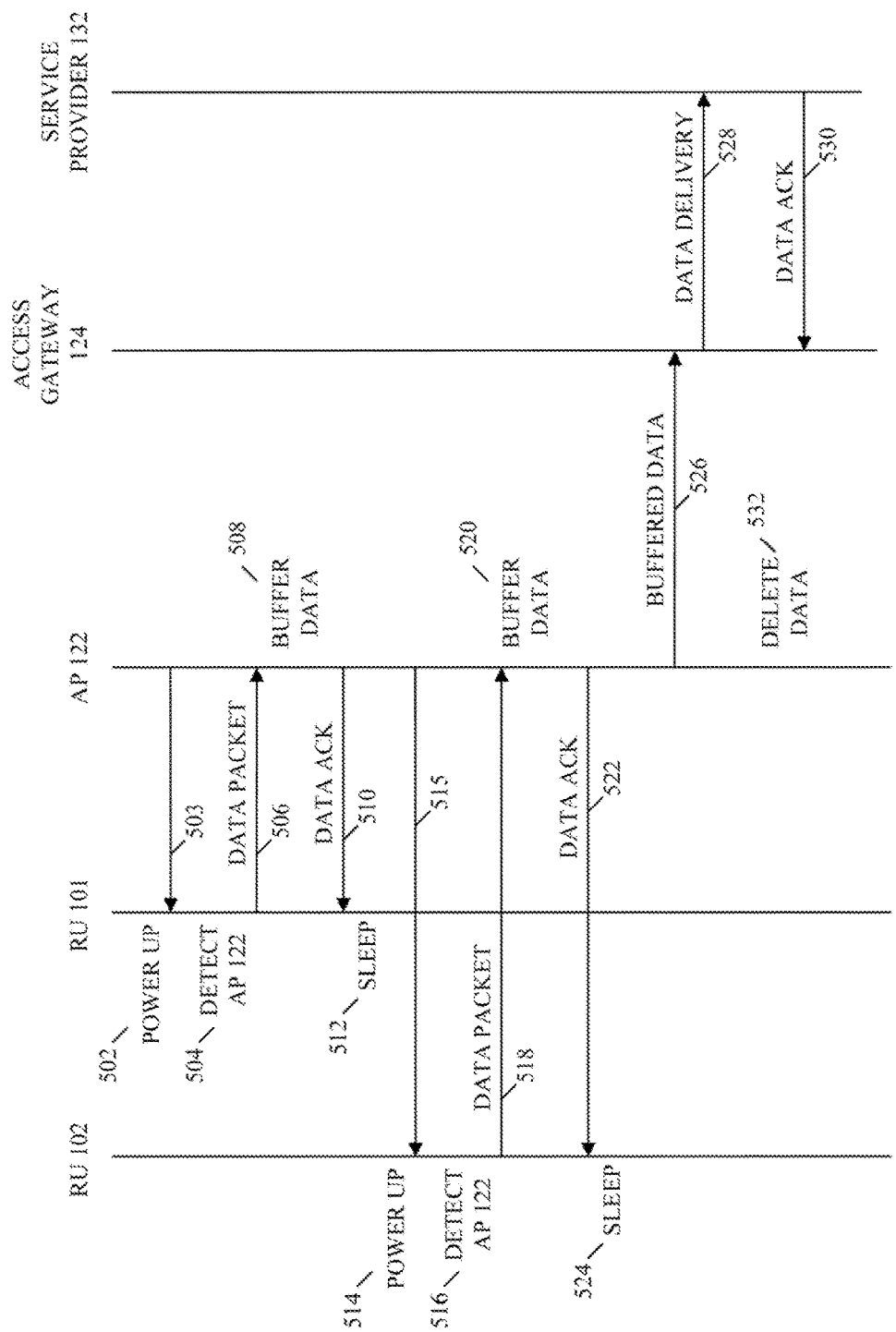
FIG. 5 is a signal flow diagram illustrating a procedure by which a remote unit of FIG. 1 that is part of a collective conveys data to an associated service provider in accordance with various embodiments of the present invention.

Referring now to FIG. 5, a signal flow diagram 500 is provided that illustrates an procedure by which an RU that is part of a collective, such as RU 101 and collective 104, conveys data to the associated service provider 132 in accordance with various embodiments of the present invention. Signal flow diagram 500 begins when a first RU, for example, RU 101, of the collective 104 of RUs 101-103 has data for conveyance to an associated service provider, that is, service provider 132. RU 101 powers up 502 in the coverage area of AP 122 and detects 504 AP 122 by detecting a signal transmitted 503 by, and identifying, the AP. For example, RU 101 may detect a Beacon that is intermittently transmitted the AP and that includes the SSID associated with the AP. By way of another example, RU 101 may broadcast a Probe Request that includes the SSID associated with AP 122. Upon receiving the Probe Request, AP 122 determines that the SSID included in the Probe Request is the same as the SSID associated with the AP and responds to the Probe Request by transmitting a Probe Response back to the MS that includes the SSID.

In response to detecting AP 122, RU 101 conveys 506 a data packet to the AP that includes the RU's collective AID, that is, the AID associated with collective 104, and that further includes the RU identifier associated with RU 101 and the data intended for service provider 132. In response to receiving the data packet, AP 122 stores 508 the data, in association with the RU identifier associated with RU 101, in the data buffer associated with uplink transmissions to service provider 132, that is, buffer $310_A$, and conveys 510 an acknowledgement of the data packet back to RU 101. In response to receiving the acknowledgement, RU 101 may go back to sleep 512.

Similarly, a second RU, for example, RU 102, of the collective 104 of RUs 101-103 also may have data for conveyance to an associated service provider, that is, service provider 132. RU 102 powers up 514 in the coverage area of AP 122 and detects 516 AP 122 by detecting a signal transmitted 515 by, and identifying, the AP. In response to detecting AP 122, RU 102 conveys 518 a data packet to the AP that includes the RU's collective AID, that is, the AID associated with collective 104, and that further includes the RU identifier associated with RU 102 and the data intended for service provider 132. In response to receiving the data packet, AP 122 stores 520 the data, in association with the RU identifier associated with RU 102, in the data buffer associated with uplink transmissions to service provider 132, that is, buffer $310_A$, and conveys 522 an acknowledgement of the data packet back to RU 102. In response to receiving the acknowledgement, RU 102 may go back to sleep 524.

At some point in time subsequent to receiving the data from RUs 101 and 102, AP 122 conveys 526, 528, to service provider 132 via access gateway 124, all data stored by the AP for conveyance to the service provider, such as in buffer $310_A$. By way of various examples, in various embodiments of the present invention, AP 122 may convey the data after receiving, and storing in buffer $310_A$, data from a predetermined number of RUs 101-103 serviced by the AP and associated with service provider 132, or may convey the data periodically based on a predetermined time period maintained in at least one memory device 304 and as determined by reference to timer 312, or may convey the data after expiration of a predetermined period of time (determined by reference to timer 312) since a first, in time, data packet currently stored in buffer $310_A$ was received by the AP.

More particularly, AP 122 conveys 526 the data, and associated RU identifiers, received from each RU 101-103 and stored in buffer $310_A$, to access gateway 124 and then deletes 532 the stored and conveyed data. In response to receiving the data, access gateway conveys 528 a data delivery message to service provider 132 that includes the stored data in association with the corresponding RU identifiers. In turn, in response to receiving the data, service provider conveys 530 an acknowledgment of the data to access gateway 124, and signal flow diagram 500 then ends.

Figure 6:
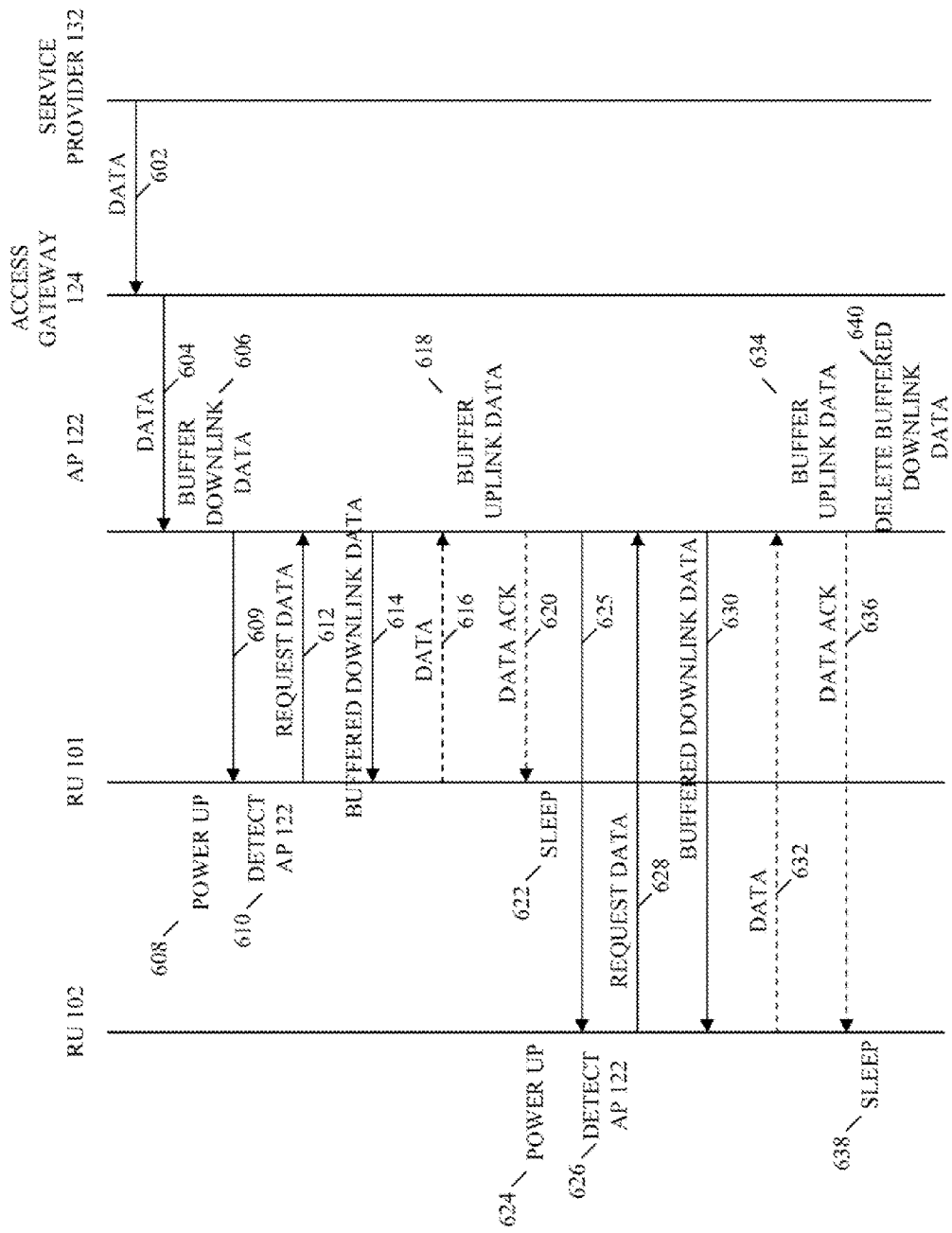
FIG. 6 is a signal flow diagram illustrating a procedure by which a service provider of FIG. 1 sends data to collective comprising multiple remote units associated with the service provider in accordance with an embodiment of the present invention.

Referring now to FIG. 6, a signal flow diagram 600 is provided that illustrates an procedure by which a service provider, such as servicer provider 132, sends data to collective 104 comprising multiple RUs 101-103 associated with the service provider in accordance with an embodiment of the present invention. Signal flow diagram 600 begins when the service provider, that is, service provider 132, conveys 602, 604 one or more data packets to an AP, that is, AP 122, serving the multiple RUs 101-103 associated with the service provider via an access gateway serving the AP, that is, access gateway 124. The conveyed one or more data packets include common data that is to be shared among all of the RUs 101-103 in collective 104. The conveyed one or more data packets further include an indication that the data packets comprise shared data and an indication of the collective, that is, collective 104, for which the shared data is intended. The conveyed one or more data packets may further include data that intended for a specific RU, such as RU 101, for example, control data that would indicate that the service is to be turned on or off, in which event the data intended for a specific RU would be accompanied by an RU identifier associated with that RU.

In response to receiving the data from service provider 132, AP 122 stores 606 the received data in a buffer associated with downlink transmissions from service provider 132 to collective 104, that is, buffer $308_A$, and broadcasts a Beacon, or then provides Probe Responses to RUs 101-103 associated with collective 104, that includes the SSID associated with AP 122 and the AID associated with collective 104.

Subsequent to receiving and storing data intended for collective 104, AP 122 transmits 609, 625 signals to the RUs 101-103 included in collective 104 indicating that the AP has data to conveyance to the collective. For example, the AP may broadcast Beacons that include the SSID associated with the AP and the AID associated with collective 104 or, in response to receiving a Probe Request from an RU, the AP may convey a Probe Response back to the RU that includes the SSID associated with the AP and the AID associated with collective 104. When an RU of the collective, for example, RU 101, then powers up 608 in the coverage area of AP 122, the RU detects 610 one or more such signals transmitted by AP 122. For example, RU 101 may detect a Beacon that includes the SSID associated with the AP and the AID associated with collective 104, or the RU may broadcast a Probe Request that includes the SSID associated with AP 122 and, in response, receive a Probe Response that includes the SSID and the AID associated with collective 104.

In response to detecting AP 122 and the AID associated with the RU's collective, RU 101 conveys 612 a data request to the AP that includes the RU's collective AID, that is, the AID associated with collective 104, and the RU identifier associated with RU 101. The data request further requests that the AP convey to the RU any stored data intended for the RU, such as shared data intended for collective 104 or RU-specific data intended for RU 101. In response to receiving the data request, AP 122 conveys 614, to RU 101, all stored data intended for the RU, such as shared data received from service provider 132 and intended for collective 104 and any other data received from service provider 132 and specifically intended for RU 101.

Figure 7:
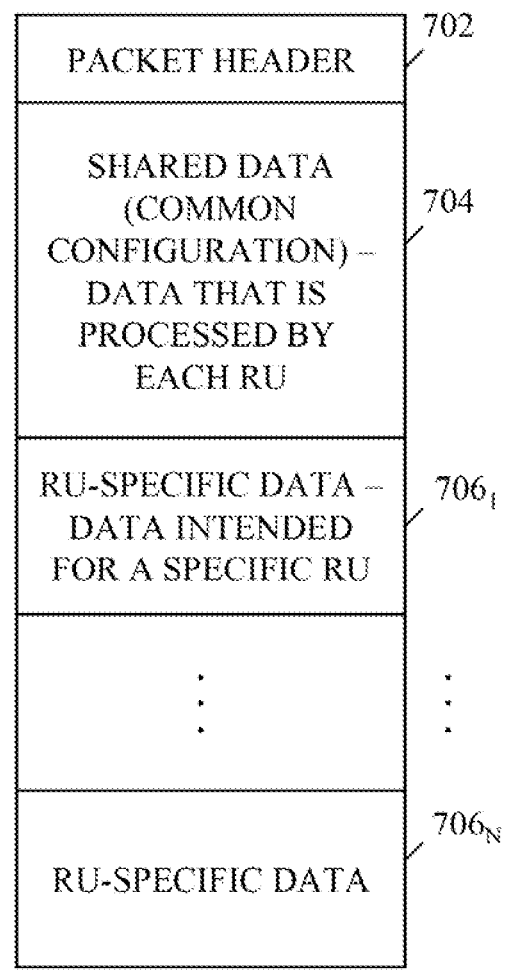
FIG. 7 is a block diagram of an exemplary data packet used to deliver data to a collective of remote units in accordance with various embodiments of the present invention.

For example, FIG. 7 is a block diagram of an exemplary data packet 700 for delivery to RUs in a collective in accordance with various embodiments of the present invention. Data packet 700 includes a first data block 702 comprising a packet header and a second data block comprising shared data, that is, data intended for all of the RUs in a collective, for example, RUs 101-103 in collective 104. The data in data block 704 is processed by all RUs 101-103 in the collective and could include traffic data or control data such as operational data or configuration-type data, such as timer 312 values or shared keys for securing end-to-end (RU-to-service provider) communications. In one embodiment of the present invention, shared data block 704 may be identified by inclusion of the collective AID in the block. In another embodiment of the present invention, the collective AID may be included in the packet header or in a control block of the data packet and may identify the location of the shared block in the data packet. In still another embodiment of the present invention, the packet header may include a flag that indicates the presence of shared data in the data packet, and when an RU detects the flag, the RU continues reading the packet for a collective informational element (IE) that indicates to the RU whether there is a shared data block or an RU specific data block included in the packet.

Data packet 700 further may include a one or more additional data blocks $706_1$-$706_N$ (wherein each of the 'N' data blocks shown is associated with one of 'N' RUs in collective 104) that each includes RU-specific data, that is, data intended for only a specific RU. The blocks may be segmented in any way that may occur to one of ordinary skill, for example, in XML, the block may be data segments with appropriate type or address elements, or the blocks may comprise hierarchical length, type, and data sequences, or the blocks may be segmented by use of offset pointers in the packet header.

In addition to receiving data from AP 122, RU 101 further may convey 616 a data packet to the AP that includes the RU's collective AID, that is, the AID associated with collective 104, the RU identifier associated with RU 101, and data intended for service provider 132. In response to receiving the data packet, AP 122 stores 618 the data, in association with the RU identifier associated with RU 101, in the data buffer associated with uplink transmissions to service provider 132, that is, buffer $310_A$, and conveys 620 an acknowledgement of the data packet back to RU 101. In response to receiving the acknowledgement, RU 101 may go back to sleep 622.

Similar to RU 101, a second RU of collective 104, such as RU 102, also may receive the service provider 132 shared data stored at AP 122 and intended for collective 104, along with any stored RU-specific data intended for the RU. For example, RU 102 may power up 624 in the coverage area of AP 122 and detect 626 AP 122, that is, detect signal 625 transmitted by AP 122. In response to detecting AP 122, RU 102 conveys 628 a data request to the AP that includes the RU's collective AID, that is, the AID associated with collective 104, the RU identifier associated with RU 102, and requests that the AP convey to the RU any stored data intended for the RU, such as shared data intended for collective 104 or RU-specific data intended for RU 102. In response to receiving the data request, AP 122 conveys 630, to RU 102, all stored data intended for the RU, such as shared data received from service provider 132 and intended for collective 104 and any other data received from service provider 132 and specifically intended for RU 102.

RU 102 further may convey 632 a data packet to the AP that includes the RU's collective AID, that is, the AID associated with collective 104, the RU identifier associated with RU 102, and data intended for service provider 132. In response to receiving the data packet, AP 122 stores 634 the data, in association with the RU identifier associated with RU 102, in the data buffer associated with uplink transmissions to service provider 132, that is, buffer $310_A$, and conveys 636 an acknowledgement of the data packet back to RU 102. In response to receiving the acknowledgement, RU 102 may go back to sleep 638.

The messaging described above with respect to RUs 101 and 102 of collective 104 may continue with respect to other RUs, such as RU 103, of the collective until all such RUs have communicated with AP 122. AP 122 then may delete 640 the data received from service provider 132 and intended for the RUs of collective 104, which data is stored in downlink buffer $308_A$, and convey, to service provider 132, the data received from the RUs of collective 104 and stored in uplink buffer $310_A$ as described above with respect to FIG. 5. Meanwhile, the RUs associated with other service providers, such as RUs 111-113 associated with service provider 134, and correspondingly belonging to other collectives, such as collective 114, and associated with different collective AIDs than the RU 101-103 of collective 104, do not detect their collective AID when they power up and detect AP 122. As a result, they go back to sleep without exchanging any data with AP 122. Signal flow diagram 600 then ends.

By utilizing a collective association identifier (AID) that assigned to, and shared by, the multiple RUs belonging to a collective of RUs, and which collective of RUs are associated with a same non-RF service provider, communication system 100 optimizes AID usage by a serving AP. Use of the collective association AID allows the serving AP to singly store common data intended for all RUs in the collective and to broadcast such data to the collective of RUs without the need to individually identify each such RU in the broadcast. Thus RU power is conserved by allowing the RU to merely wake up and receive a broadcast of the data by the AP, as opposed to having to associate with the AP each time the RU wished to receive data from the AP, and a required size of a buffer at the serving AP, that stores data intended for the collective of RUs, is minimized Furthermore, communication system 100 further provides for RUs to establish a link with their serving AP in order to exchange data sourced by, or intended for, their associated non-RF service provider, and for the AP then to establish a separate AP-to-service provider link to exchange the data, rather than the RU being required to establish an end-to-end link with the service provider for a transfer of data, such as a TCP (Transmission Control Protocol), further conserving RU power by reducing the time for the RU to set up a communication session for communicating data to an associated non-RF service provider that uses the WLAN/AP to communicate with the RU.

While signal flow diagrams 400, 500, and 600 are described with respect to RU 101 and/or RU 102 and service provider 132, RU 101, RU 102, and service provider 132 merely are used to illustration the operation of communication system 101 and the principles of the present invention as described by signal flow diagrams 400, 500, and 600, and the signal flow diagrams are intended to apply to all of the multiple RUs 101-103, 111-113 serviced by AP 122 and the service providers 132, 134 associated with the AP.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for providing wireless service by a wireless local area network to a plurality of remote units, the method comprising:
   using an access point associated with the wireless local area network and coupled to a plurality of non-radio frequency service providers via a data network to perform
   assigning a collective association identifier (AID) to the plurality of remote units;
   conveying a signal to each remote unit of the plurality of remote units comprising the collective AID; and
   storing the collective AID in association with an identifier of each remote unit of the plurality of remote units,
   wherein the plurality of remote units define one collective of a plurality of collectives, wherein the plurality of collectives comprise respective groups of one or more remote units, wherein each collective is dedicated to provide service in association with a respective one of the plurality of non-radio frequency service providers, and is assigned a respective collective AID, and wherein each remote unit of the plurality of remote units is associated with a same non-radio frequency service provider, and the method further comprising:

receiving a data packet from a first remote unit of the plurality of remote units, wherein the data packet received from the first remote unit includes data and the collective association identifier (AID);

storing, at a network element of the wireless local area network, the data received from the first remote unit;

receiving a data packet from a second remote unit of the plurality of remote units, wherein the data packet received from the second remote unit includes data and the collective AID;

storing, at the network element, the data received from the second remote unit; and conveying, to the same non-radio frequency service provider, the stored data received from the first remote unit and second remote unit.

2. The method of claim 1, wherein conveying, to the same non-radio frequency service provider, the stored data comprises one or more of:

conveying the stored data after receiving, and storing, data from a predetermined number of remote units of the plurality of remote units;

conveying the stored data based on a predetermined time period; and conveying the stored data after expiration of a predetermined period of time since a first, in time, data packet associated with the stored data was received by the network element.

3. A method for providing wireless service by a wireless local area network to a plurality of remote units, the method comprising:

using an access point associated with the wireless local area network and coupled to a plurality of non-radio frequency service providers via a data network to perform assigning a collective association identifier (AID) to the plurality of remote units;

conveying a signal to each remote unit of the plurality of remote units comprising the collective AID; and storing the collective AID in association with an identifier of each remote unit of the plurality of remote units, wherein the plurality of remote units define one collective of a plurality of collectives, and wherein the plurality of collectives comprise respective groups of one or more remote units, wherein each collective is dedicated to provide service in association with a respective one of the plurality of non-radio frequency service providers, and is assigned a respective collective AID, and the method further comprising:

receiving data from a non-radio frequency service provider associated with each remote unit of the plurality of remote units, wherein the data comprises common data intended for all of the plurality of remote units;

storing the received data at a network element of the wireless local area network;

receiving a request for data from a remote unit of the plurality of remote units, wherein the request comprises the collective association identifier (AID); and conveying the common data to the remote unit based on the collective AID.

4. The method of claim 3, wherein the remote unit is a first remote unit and wherein the method further comprises:

receiving a request for data from a second remote unit of the plurality of remote units, wherein the request comprises the collective association identifier (AID); and conveying the common data to the second remote unit based on the collective AID.

5. The method of claim 3, wherein the data received from the non-radio frequency service provider further comprises remote unit-specific data and wherein the method further comprises conveying, to the remote unit, remote unit-specific data intended for the remote unit.

6. The method of claim 3, wherein the common data, intended for each remote unit of the plurality of remote units, is identified by the collective association identifier (AID) and wherein remote unit-specific data is identified by a remote unit-specific identifier.

7. The method of claim 3, further comprising deleting the stored data.

8. A method for interfacing with a wireless local area network, the method comprising:

associating, by a remote unit, with an access point associated with the wireless local area network and coupled to a plurality of non-radio frequency service providers via a data network;

receiving, by the remote unit from the access point, a collective association identifier (AID) that is associated with a plurality of remote units; and storing, by the remote unit, the collective AID, wherein the plurality of remote units define one collective of a plurality of collectives, wherein the plurality of collectives comprise respective groups of one or more remote units, wherein each collective is dedicated to provide service in association with a respective one of the plurality of non-radio frequency service providers, and is assigned a respective collective AID, and the remote unit is associated with a same non-radio frequency service provider as the other remote units of the plurality of remote units, and the method further comprising conveying, to the access point, data intended for the same non-radio frequency service provider in a data packet that includes the collective association identifier (AID).

9. A method for interfacing with a wireless local area network, the method comprising:

associating, by a remote unit, with an access point associated with the wireless local area network and coupled to a plurality of non-radio frequency service providers via a data network;

receiving, by the remote unit from the access point, a collective association identifier (AID) that is associated with a plurality of remote units; and storing, by the remote unit, the collective AID, wherein the plurality of remote units define one collective of a plurality of collectives, and wherein the plurality of collectives comprise respective groups of one or more remote units, wherein each collective is dedicated to provide service in association with a respective one of the plurality of non-radio frequency service providers, and is assigned a respective collective AID, and the method further comprising
  conveying, to the access point, a request for data that comprises the collective association identifier (AID); and
  in response to conveying the request for data, receiving, from the access point, common data intended for each remote unit of the plurality of remote units.

10. The method of claim 9, further comprising, in response to conveying the request for data, receiving remote unit-specific data.

11. The method of claim 10, wherein the common data, intended for each remote unit of the plurality of remote units, is identified by the collective association identifier (AID) and wherein the remote unit-specific data is identified by a remote unit-specific identifier.

12. An access point capable of operating in a wireless local area network, the access point being associable with the wireless local area network, being coupleable to a plurality of non-radio frequency service providers via a data network, and comprising:
  an at least one memory device that maintains a plurality of association identifiers (AIDs); and
  a processor coupled to at least one memory device and that is configured to that assign an association identifier (AID) of the plurality of Al Ds collective association identifier (AID) to a plurality of remote units to produce a collective AID, convey a signal to each remote unit of the plurality of remote units comprising the collective AID, and store, in the at least one memory device, an association between the collective AID and an identifier of each remote unit of the plurality of remote units,
  wherein the plurality of remote units define one collective of a plurality of collectives,
  wherein the plurality of collectives comprise respective groups of one or more remote units, wherein each collective is dedicated to provide service in association with a respective one of the plurality of non-radio frequency service providers, and is assigned a respective collective AID,
  wherein each remote unit of the plurality of remote units is associated with a same non-radio frequency service provider, and
  wherein the processor is configured to receive data from a first remote unit of the plurality of remote units, wherein the data packet includes the collective association identifier (AID), store, in the at least one memory device, the data received from the first remote unit, receive data from a second remote unit of the plurality of remote units, wherein the data packet includes the collective AID, store, in the at least one memory device, the data received from the second remote unit, and convey, to the same non-radio frequency service provider, the stored data received from the first remote unit and second remote unit.

13. The access point of claim 12, wherein the processor is configured to convey, to the same non-radio frequency service provider, the stored data by one or more of:
  conveying the stored data after receiving, and storing, data from a predetermined number of remote units of the plurality of remote units;
  conveying the stored data based on a predetermined time period; and
  conveying the stored data after expiration of a predetermined period of time since a first, in time, data packet associated with the stored data was received by the network element.

14. An access point capable of operating in a wireless local area network, the access point being associable with the wireless local area network, being coupleable to a plurality of non-radio frequency service providers via a data network, and comprising:
  an at least one memory device that maintains a plurality of association identifiers (AIDs); and
  a processor coupled to at least one memory device and that is configured to that assign an association identifier (AID) of the plurality of Al Ds collective association identifier (AID) to a plurality of remote units to produce a collective AID, convey a signal to each remote unit of the plurality of remote units comprising the collective AID, and store, in the at least one memory device, an association between the collective AID and an identifier of each remote unit of the plurality of remote units,
  wherein the plurality of remote units define one collective of a plurality of collectives,
  wherein the plurality of collectives comprise respective groups of one or more remote units, wherein each collective is dedicated to provide service in association with a respective one of the plurality of non-radio frequency service providers, and is assigned a respective collective AID, and
  wherein the processor is configured to receive data from a non-radio frequency service provider associated with each remote unit of the plurality of remote units, wherein the data comprises common data intended for all of the plurality of remote units, store, in the at least one memory device, the received data, receive a request for data from a remote unit of the plurality of remote units, wherein the request comprises the collective association identifier (AID), and convey the common data to the remote unit based on the collective AID.

15. The access point of claim 14, wherein the remote unit is a first remote unit and wherein the processor is configured to receive a request for data from a second remote unit of the plurality of remote units, wherein the request comprises the collective association identifier (AID), and convey the common data to the second remote unit based on the collective AID.

16. access point of claim 14, wherein the data received from the non-radio frequency service provider further comprises remote unit-specific data and wherein the processor is configured to convey, to the remote unit, remote unit-specific data intended for the remote unit.

17. The access point of claim 14, wherein the processor is configured to identify the common data to each remote unit of the plurality of remote units, by conveying the collective association identifier (AID) in association with the common data and wherein the processor is configured to identify remote unit-specific data by including, in the conveyance, a remote unit-specific identifier in association with the remote unit-specific data.

18. The access point of claim 14, wherein the processor is configured to delete the stored data.

19. A remote unit capable of interfacing with a wireless local area network, the remote unit comprising:
  an at least one memory device that maintains a remote unit-specific identifier associated with the remote unit; and
  a processor that is configured to associate with an access point associated with the wireless local area network and coupled to a plurality of non-radio frequency service providers via a data network, receive a collective association identifier (AID) that is associated with a plurality of remote units, and store the collective AID in the at least one memory device, wherein the plurality of remote units define one collective of a plurality of collectives, wherein the plurality of collectives comprise respective groups of one or more remote units, wherein each collective is dedicated to provide service in association with a respective one of the plurality of non-radio frequency service providers, and is assigned a respective collective AID, the remote unit is associated with a same non-radio frequency service provider as the other remote units of the plurality of remote units, and wherein the processor is configured to convey, to the access point, data intended for the same non-radio frequency service provider in a data packet that includes the collective association identifier (AID).

20. A remote unit capable of interfacing with a wireless local area network, the remote unit comprising:

an at least one memory device that maintains a remote unit-specific identifier associated with the remote unit; and a processor that is configured to associate with an access point associated with the wireless local area network and coupled to a plurality of non-radio frequency service providers via a data network, receive a collective association identifier (AID) that is associated with a plurality of remote units, and store the collective AID in the at least one memory device, wherein the plurality of remote units define one collective of a plurality of collectives, wherein the plurality of collectives comprise respective groups of one or more remote units, wherein each collective is dedicated to provide service in association with a respective one of the plurality of non-radio frequency service providers, and is assigned a respective collective AID, and wherein the processor is configured to convey, to the access point, a request for data that comprises the collective association identifier (AID) and, in response to conveying the request for data, receive, from the access point, common data intended for each remote unit of the plurality of remote units.

21. The remote unit of claim 20, wherein the processor is configured to, in response to conveying the request for data, receive remote unit-specific data intended for the remote unit.

22. The remote unit of claim 21, wherein the common data, intended for each remote unit of the plurality of remote units, is identified by the collective association identifier (AID) and wherein the remote unit-specific data is identified by the remote unit-specific identifier.

* * * * *